(12) United States Patent
Kwon et al.

(10) Patent No.: US 10,671,586 B2
(45) Date of Patent: Jun. 2, 2020

(54) OPTIMAL SORT KEY COMPRESSION AND INDEX REBUILDING

(71) Applicant: SAP SE, Walldorf (DE)

(72) Inventors: Yong Sik Kwon, Seoul (KR); Kunsoo Park, Seoul (KR); Cheol Yoo, Seoul (KR)

(73) Assignee: SAP SE, Walldorf (DE)

( * ) Notice: Subject to any disclaimer, the term of this patent is extended or adjusted under 35 U.S.C. 154(b) by 192 days.

(21) Appl. No.: 15/658,671

(22) Filed: Jul. 25, 2017

(65) Prior Publication Data
US 2019/0034467 A1    Jan. 31, 2019

(51) Int. Cl.
*G06F 17/00* (2019.01)
*G06F 16/22* (2019.01)
*G06F 16/23* (2019.01)

(52) U.S. Cl.
CPC ...... *G06F 16/2272* (2019.01); *G06F 16/2228* (2019.01); *G06F 16/23* (2019.01)

(58) Field of Classification Search
CPC ........ G06F 16/81; G06F 16/29; G06F 16/835; G06F 9/5072; G06F 16/2272; G06F 16/245

See application file for complete search history.

(56) References Cited

U.S. PATENT DOCUMENTS

| | | | |
|---|---|---|---|
| 4,677,550 A | 6/1987 | Ferguson | |
| 2002/0095397 A1* | 7/2002 | Koskas | G06F 16/24534 |
| 2007/0088740 A1* | 4/2007 | Davies | G06F 9/4488 |
| 2007/0255748 A1* | 11/2007 | Ferragina | G06F 16/9027 |
| 2010/0146003 A1 | 6/2010 | Bruso et al. | |
| 2014/0365500 A1* | 12/2014 | Futamura | G06F 16/2255 707/743 |

OTHER PUBLICATIONS

"Communication: Extended European Search Report", dated Feb. 4, 2019 (dated Feb. 4, 2019), European Patent Office, for European Application No. 18184685.8-1217 / 3435256, 18pgs.

Ferguson, David E "Bit-Tree a Data Structure for Fast File Processing", Communications of the ACM, Association for Computing Machinery, Inc., vol. 35. No. 6, Jun. 1, 1992 (Jun. 1, 1992), XP058283538, ISSN: 0001-0782, DOI: 10.1145/129888.129896, (pp. 114-120, 7 total pages).

"Communication: Partial European Search Report", dated Oct. 25, 2018 (dated Oct. 23, 2018), European Patent Office, for European Application No. 18184685.8-1217, 15pgs.

* cited by examiner

*Primary Examiner* — Truong V Vo
(74) *Attorney, Agent, or Firm* — Buckley, Maschoff & Talwalkar LLC

(57) ABSTRACT

A system and method, including determining, by a processor, distinction bit positions for index keys of a database index; determining, by the processor, concatenation of the bits of the index keys; and generating a record of the concatenation. Other systems and methods include collecting, by a processor, index keys of a database index in parallel, wherein data pages of a target table are evenly distributed to a plurality of processor cores; scanning, by each of the cores the data pages to extract compressed keys and corresponding record identifiers; sorting, by a plurality of the processor cores, pairs of the compressed key and corresponding record identifier in accordance with a parallel sorting algorithm; generating an index tree in a bottom-up fashion; and storing a record of the generated index tree.

20 Claims, 7 Drawing Sheets

| value | binary representation | index key binary representation |
|---|---|---|
| $2^{15}-1$ | 0 1111111 11111111 | 1 1111111 11111111 |
| 1 | 0 0000000 00000001 | 1 0000000 00000001 |
| 0 | 0 0000000 00000000 | 1 0000000 00000000 |
| -1 | 1 1111111 11111111 | 0 1111111 11111111 |
| -2 | 1 1111111 11111110 | 0 1111111 11111110 |
| $-2^{15}$ | 1 0000000 00000000 | 0 0000000 00000000 |

*FIG. 2A*

| value | binary representation | index key binary representation |
|---|---|---|
| 99 | 00000011 01100011 | 00000011 01100011 |
| 1 | 00000011 00000001 | 00000011 00000001 |
| 0 | 00000010 00000000 | 00000010 00000000 |
| -1 | 00000010 00000001 | 00000010 11111110 |
| -99 | 00000010 01100011 | 00000010 10011100 |

*FIG. 2B*

| value | binary representation | index key binary representation |
|---|---|---|
| + infinity | 0 11111 0000000000 | 1 11111 0000000000 |
| 1.0 | 0 01111 0000000000 | 1 01111 0000000000 |
| $2^{-14}$ | 0 00000 0000000001 | 1 00000 0000000001 |
| 0.0 | 0 00000 0000000000 | 1 00000 0000000000 |
| -0.0 | 1 00000 0000000000 | 0 11111 1111111111 |
| $-2^{-14}$ | 1 00000 0000000001 | 0 11111 1111111110 |
| -1.0 | 1 01111 0000000000 | 0 10000 1111111111 |
| - infinity | 1 11111 0000000000 | 0 00000 1111111111 |

*FIG. 2C*

| PART (INT) | NAME (VARCHAR(30)) | XXX (INT) | YYY (INT) | ZZZ (VARCHAR(15)) |
|---|---|---|---|---|
| 14 | AB | 27 | 8 | DDDC |
| 14 | AB | 27 | 8 | DDDE |
| 14 | ABA | 27 | 10 | DE |

*FIG. 3A*

| 10...01110 | A | B |  | 10...11011 | 10...00100 | D | D | D | C |  |
| 10...01110 | A | B |  | 10...11011 | 10...00100 | D | D | D | E |  |
| 10...01110 | A | B | A |  | 10...11011 | 10...00110 | D | E |  |  |

*FIG. 3B*

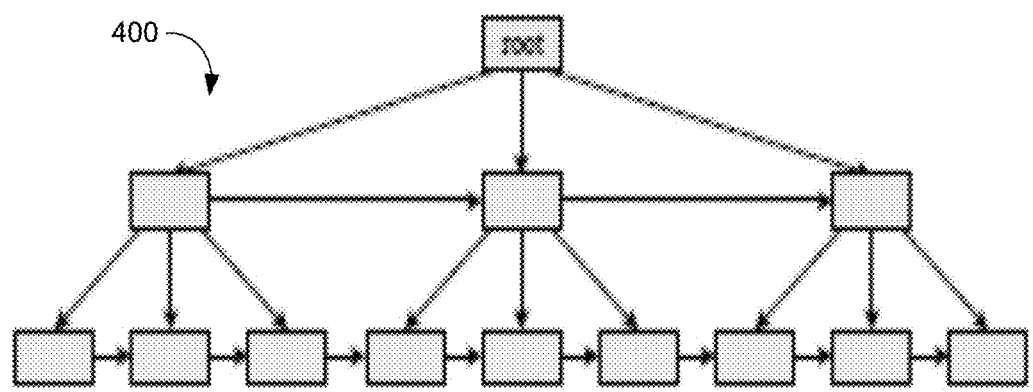
FIG. 4A
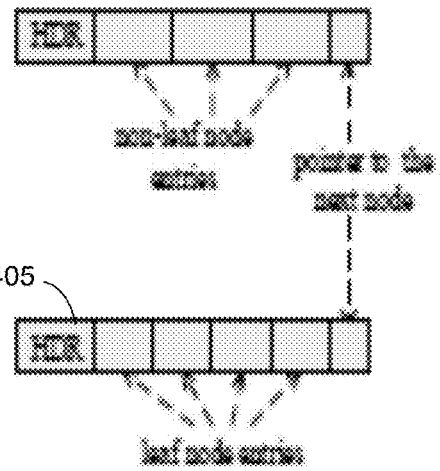
FIG. 4B
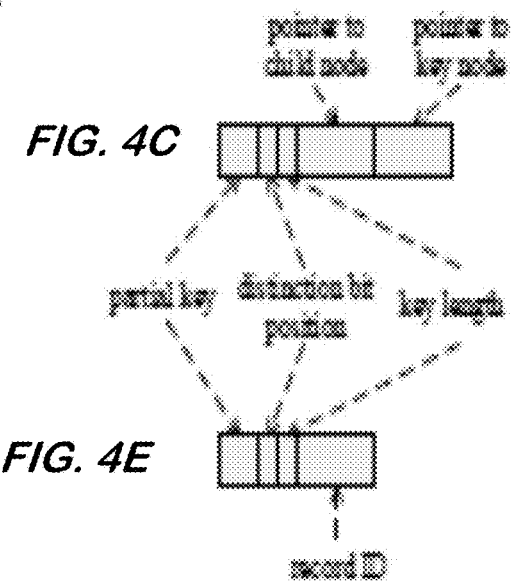
FIG. 4C
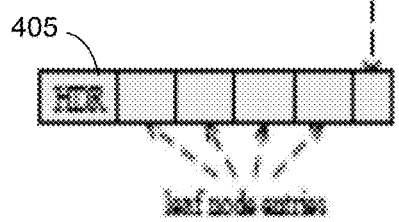
FIG. 4D
FIG. 4E

OPTIMAL SORT KEY COMPRESSION AND INDEX REBUILDING

BACKGROUND

In a context where an index is maintained for a database table and the index key consists of one or more columns of the table, there might be a point in time when the index is either lost or otherwise unavailable due to one reason or another. In such instances, the index will need to be rebuilt. To accurately rebuild the index, index keys should be sorted by the order of the key values. One consideration with rebuilding a database table index might be what is the minimum information (e.g., the number of bits in index keys) to retain, to sort the index keys correctly. This minimum information should be sufficient to determine the correct sorted order of index keys from which the index can be rebuilt.

In some scenarios including a database replication, an index created in a master server should be reflected in other replicas. One method of accomplishing this task is to send the index image to other replicas over a network. However, this method incurs a network overhead that can be a performance bottleneck of the replication system. Another index replication method may include a replay of the index creation in the replicas to avoid the network overhead. Some other approaches might seek improvements in index replication or rebuilding by attempting to determine if there is some information that might be used to reduce the cost of index creation in the replicas.

In some contexts, there may exist a desire to more efficiently perform index rebuilding operations, while conserving system resources.

BRIEF DESCRIPTION OF THE DRAWINGS

FIG. 2 is an illustrative depiction of example binary representations of index key values;

FIG. 3 is an illustrative depiction of example index keys;

FIG. 4 is an illustrative depiction of an index tree; and

DETAILED DESCRIPTION

Figures 1A, 1B:
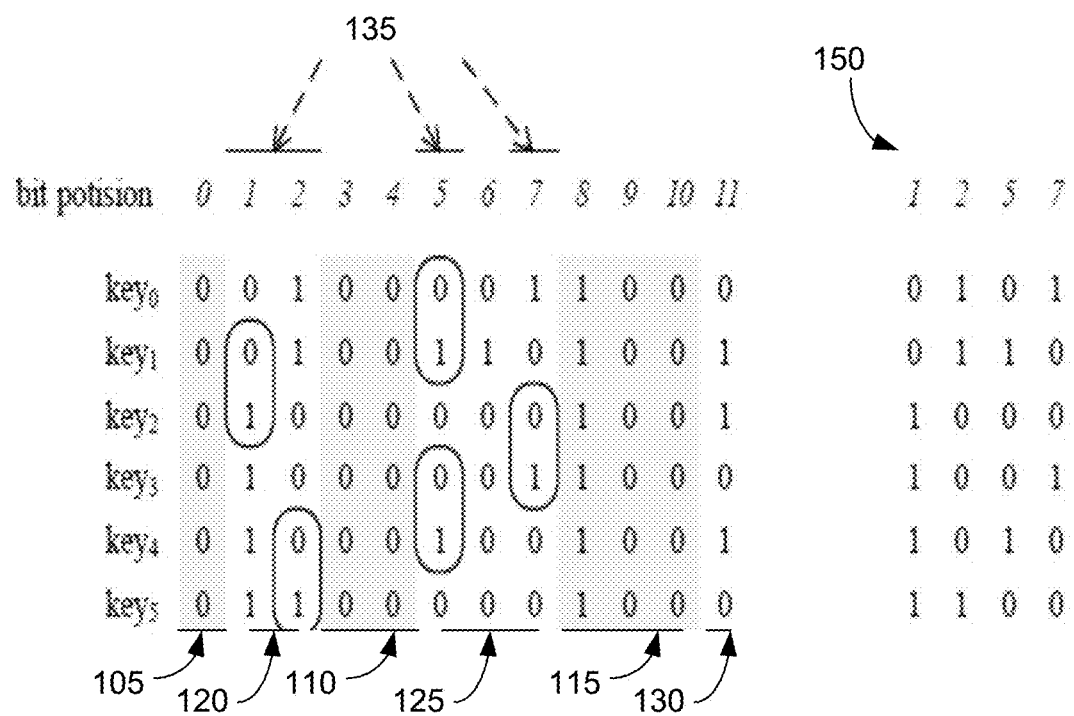
FIG. 1 is an illustrative depiction of index bits.

The following description is provided to enable any person in the art to make and use the described embodiments. Various modifications, however, will remain readily apparent to those in the art.

Conventional databases treat indexes as persistent structures and thus any index update incurs run-time disk I/O (input/output) to write to a persistent update log and index node pages. For in-memory databases, a different approach of maintaining in-memory (i.e., not persistent) index structures might be used. Update transactions, for example, may benefit from this approach because it eliminates run-time disk I/O associated with index updates. However, this approach incurs the cost of building indexes during database recovery. The present disclosure provides a system and method that can reduce significantly the cost of index rebuilding during a database recovery. Applicants have realized (e.g., via experiments) a parallel index rebuilding with multi-core CPUs method and system as disclosed herein that is faster than, for example, the loading of a disk-resident index image to the memory.

The present disclosure includes a number of technical innovations. Herein, "distinction bits" of index keys are shown to be the minimum information needed to sort the index keys correctly (i.e., necessary and sufficient to determine the correct order of the index keys). Other disclosed aspects include, in one embodiment, a sort key compression scheme that stores only the distinction bits of index keys. This sort key compression scheme provides a mechanism that can be useful to reduce the cost of rebuilding an index. In the sense that distinction bits are the minimum possible information needed and used to accurately determine the order of the index keys, the key compression scheme disclosed herein may be considered optimal.

In some embodiments, the compression ratio of the key compression scheme herein may vary depending on the characteristics of the associated datasets. Applicants have realized compression ratios for sample datasets of about 2.4:1 to about 5:1, which leads to significant memory-space savings and performance improvements during the rebuilding of large-scale indexes. The sort key compression disclosed herein may be considered a lightweight scheme (e.g., the amount of information to keep is small and the cost of extracting the minimum number of bits from keys is low). Yet, its benefits in memory-space savings and performance improvements are significant. Furthermore, the sort key compression scheme disclosed can be used in various different applications that include sorting with sort keys longer than the word size.

In some embodiments, index keys for database tables can be as short as 4 bytes, but they might be longer than 30 bytes in some business applications. Hence, index trees and all related algorithms (e.g., sorting index keys, building the index, searching with a query key, etc.) should be able to handle long keys as well as short keys. The sort key compression and index rebuilding processes herein assume this wide range of index key sizes. In some embodiments, the sort key compression scheme herein may be applied to an index tree in a commercial in-memory DBMS.

In some embodiments, to speed up an index rebuilding process, multi-core processing parallelism may be leveraged in building an index tree on-the-fly from a DB (database) table in four stages:
1. The data pages of a DB table are evenly distributed to the available cores.
2. Each core extracts compressed keys (distinction bits) from the data pages.
3. Sort the compressed keys by a parallel sorting algorithm referred to herein as row-column sort.
4. Build the index tree in parallel.

Using a variety of DB tables from the TPC-E benchmark and one DB table in an in-memory database system, Applicants observed the compression ratio for the sort key compression scheme herein of about 3.7:1 on average for the four datasets. Also observed, the key compression scheme disclosed herein reduces the time for index rebuilding by about 40% on average for the four datasets. The time to build the index tree on-the-fly from the DB table for one dataset was 1.76 seconds with 16 cores. Considering the image of this index tree is 6.74 GB, the running time for parallel index building in accordance with the present disclosure is much faster than just loading the index image to the memory, which takes 33.7 seconds for 200 MB/sec disk I/O and 12.3 seconds for 550 MB/sec SSD.

Before describing the sort key compression scheme in detail, some terms are first introduced. The bit positions where all of the key values are identical are called invariant bit positions and the bits in these positions are called invariant bits. The other bit positions are called variant bit positions and the bits themselves are called variant bits. Each row in FIG. 1A represents an index key value. In FIG. 1A, bit positions 0 (105); 3, 4, 5 (110); and 8, 9, 10 (115) are invariant bit positions and bit positions 1, 2 (120); 5, 6, 7 (125); and 11 (130) are variant bit positions.

Let $key_i$ be the i-th key value in lexicographic order, i.e., $key_0 < key_1 < \ldots < key_n$. The most significant bit position where two keys, $key_i$ and $key_j$, differ is called the distinction bit position of the two keys, denoted by D-bit($key_i$, $key_j$) and the bits themselves are referred to as "distinction bits". Let $D_i$=D-bit($key_i-1$, $key_i$) for $1 \leq i \leq n$, i.e., the distinction bit position of two adjacent keys in lexicographic order. Lemma 1 says that n(n+1)/2 distinction bit positions of all possible key pairs can be characterized by n distinction bit positions $D_i$ for $1 \leq i \leq n$, which is a crucial fact in the sort key compression scheme herein.

$$D\text{-bit}(key_i, key_j) = \min_{i < k \leq j} D_k \text{ for } 0 \leq i < j \leq n. \quad \text{Lemma 1.}$$

We prove by induction on d=j−i. When d=1, the lemma holds trivially. For induction hypothesis, assume that the lemma holds for d≥1. We now prove the lemma for d+1. Let $D = \min_{i < k \leq j-1} D_k$. Since (j−1)−i=d, D-bit($key_i$, $key_j$−1)=D by induction hypothesis. Consider D and $D_j$.

If $D > D_j$, then $D_j$ is D-bit($key_i$, $key_j$) and $D_j = \min_{i < k \leq j} D_k$.
If $D < D_j$, then D is D-bit($key_i$, $key_j$) and $D = \min_{i < k \leq j} D_k$.

Note that D cannot be equal to $D_j$ because we have only two possibilities, 0 and 1, in a bit position. For example, D-bit($key_0$, $key_2$)=1 because $D_1$=5>$D_2$=1, and D-bit($key_1$, $key_3$)=1 because $D_2$=1<$D_3$=7 in FIG. 1A.

By Lemma 1, all possible distinction bit positions for all keys are $D_i$, $1 \leq i \leq n$. In FIG. 1A, bit positions 1, 2, 5, and 7 are distinction bit positions 135 since because $D_1$=5, $D_2$=1, etc. It is seen that distinction bit positions are variant bit positions. However, there may be variant bit positions that are not distinction bit positions. In FIG. 1A, bit positions 6 and 11 are such positions (i.e., variant bit positions but not distinction bit positions).

To define partial keys in our index tree, a parameter p is given. As referred to herein, the partial key of key is the p bits following the distinction bit position $D_i$. In FIG. 1A, the partial key of $key_1$ when p=4 is 1010, since $D_1$=5.

With the definitions above to further explain the key compression herein, let Compress($key_i$) be the concatenation of the bits of key in the distinction bit positions. Herein, we define the distinction bit slice (or D-bit slice) as the collection of Compress($key_i$) for all keys, as illustrated in FIG. 1B. The distinction bit slice 150 is a collection of Compress(key)'s, not necessarily sorted by Compress($key_i$).

Theorem 1. The distinction bit slice is necessary and sufficient to determine the lexicographic order of the keys.

For sufficiency, we demonstrate that the following relation holds: $key_i < key_j$ if and only if Compress($key_i$)<Compress($key_j$) for all i and j. Let D=D-bit($key_i$, $key_j$). Since the first D bits of $key_i$ and $key_j$ are the same, the order of key and key is determined by the bits in bit position D. By Lemma 1, bits in bit position D are in Compress (and thus in the distinction bit slice). Hence, the order between key and $key_j$ is the same as the order between Compress($key_i$) and Compress($key_j$).

Due to the relation above, lexicographic order of keys can correctly determined by Compress.

In some aspects, it is easy to get an example where the lexicographic order of keys cannot be properly determined if any bit position of the distinction bit slice is missing.

Theorem 1 means that the distinction bit slice is the minimum possible information to correctly determine the lexicographic order of the keys.

A D'-bit slice is defined herein as the bits of index keys in all distinction bit positions and in zero or more other bit positions. Let $\text{Compress}_T(key_i)$ be the bits of key in a D'-bit slice T. In FIG. 1, the bits of all keys in bit positions 1, 2, 5, 6, and 7 make an example D'-bit slice.

Theorem 2. A D'-bit slice T can correctly determine the lexicographic order of keys.

As in the proof of Theorem 1, we can show that $key_i < key_j$ if and only if CompressT ($key_i$)<CompressT ($key_j$) for all i and j.

In some aspects, when we maintain an index for a DB table, index keys may be inserted, deleted, or updated by database operations. In such cases, distinction bit positions may be changed at runtime. For example, if $key_3$ is deleted in FIG. 1A, position 7 is no longer a distinction bit position and it becomes a variant bit position. If $key_0$ is deleted further to $key_3$, distinction bit positions don't change, but position 7 becomes an invariant bit position. By further example, if an index key is inserted, a new distinction bit position may be added.

In some respects, it may be quite expensive to maintain the distinction bit positions exactly at runtime when there are many insert, delete, and update operations. Theorem 2 makes it much easier to maintain distinction bit positions than Theorem 1 does because some other bit positions may be admitted in addition to distinction bit positions without affecting the correctness of the algorithm. Even if distinction bit positions are not known at all, we can use all variant bits as a D'-bit slice by Theorem 2. (In some embodiments, we would use a D'-bit slice at runtime and compute the D-bit slice as a batch process or in a background operation.)

The B+ tree and its variants are widely used as indexes in modern DBMSs to enable fast access to data with a search key. If an index is defined on columns $A_1, \ldots, A_k$ of a table, its key can be represented as a tuple of column values of the form $(a_1, \ldots, a_k)$. The ordering of the tuples is the lexicographic ordering. For example, the order of two tuples $(a_1, a_2)$ and $(b_1, b_2)$ when k=2 is determined as follows: $(a_1, a_2) < (b_1, b_2)$ if $a_1 < b_1$ or $(a_1 = b_1$ and $a_2 < b_2)$.

We now describe below how to make actual index keys from the tuples of column values so as to keep the lexicographic ordering of the tuples. The leaf nodes of an index contain index keys and record IDs of the table. The following disclosure first explains how to make index keys from different data types and then explains how to make an index key from multiple columns.

For each data type (e.g., int(eger), decimal, float, string, etc.), its index key format is defined so that lexicographic binary comparison in index key format corresponds to comparison of original data values.

For integers, the signed integer value domain is mapped to an unsigned integer value domain. For example, if the signed integer uses two's complement, we simply toggle the most significant bit of the signed integer. Then the signed integers are mapped to an unsigned integer value domain where the order of the mapped numbers corresponds to that of the signed integers, as shown in FIG. 2A.

For decimals, a decimal number x is represented by a 1B header and a decimal part. The last bit of the header is the sign of the decimal number (1 for plus) and the second-to-last bit indicates whether the entry is null or not (0 for null).

The decimal part contains a binary number corresponding to x in $\lceil \log_2(x+1)/8 \rceil$ bytes. The location of the decimal point is stored in the metadata of the column. For mapping, if the sign bit is 0, toggle all bits of the decimal part; otherwise, do nothing. Then, the order of the mapped values corresponds to that of the decimal numbers. See FIG. 2B where decimal (m, n) means m total digits, of which n digits are to the right of the decimal point.

For floating point numbers, the signed floating point domain is mapped to an unsigned integer domain. For example, suppose that the float number is represented as a sign bit, an exponent, and a significand. If the sign bit is 0, toggle it; otherwise, toggle all the bits. Then, the order of the mapped numbers corresponds to that of the signed floating points, as seen in FIG. 2C.

For a fixed string, the fixed-size string is used as it is.

For a variable-size string with maximum length, it is assumed that the null character (i.e., Ø) is not allowed in the variable-size string. (In the case that null characters are allowed, we need to use some encoding of characters so that the encoded string does not have null characters.) One null character is attached at the end of the variable-size string to make the index key value. Then, the lexicographic order of index key values corresponds to that of variable-size strings as follows. If two index keys have the same length, the order between them is trivially the order of the strings. If two index keys have different lengths (let k be the length of the shorter key) and their first k−1 bytes have different values, their order is determined by the first k−1 bytes. If two keys have different lengths and their first k−1 bytes have the same values, the shorter one is smaller in lexicographic order because it has a null character in the k-th byte and the longer one has a non-null character in the k-th byte. For instance, if two keys are ABØ and ABAØ, then ABØ is smaller than ABAØ due to the $3^{rd}$ bytes and this is the lexicographic order between two strings AB and ABA. Furthermore, the distinction bit position takes place in the null character of the shorter key.

In each data type, the order between two index keys can be determined by lexicographic binary comparison of the two index keys.

How to make an index key from multiple columns will now be explained. An index key on multiple columns is defined to be the concatenations of index keys from the multiple columns. For example, suppose that an index key is defined on the following five columns: PART (int), NAME (varchar(30)), XXX (int), YYY (int), and ZZZ (varchar (15)). Example column values in some rows are illustrated in FIG. 3A in table 300 and the index keys of the three rows are in FIG. 3B.

The distinction bit positions as discussed above are defined on these full index keys. If the data types of index columns have fixed lengths (e.g., int, decimal, float, and fixed-size string), the column values are aligned in the index keys and the order between index keys are determined by the lexicographic order of the column values.

However, if the data types of index columns have variable lengths (e.g., variable-size string), then the column values may not be aligned in the index keys, as shown in FIG. 3B. Still, the distinction bit positions are defined on these full index keys. If two rows have variable-size strings of different lengths in a column (they may have previous columns of the same values as shown in FIG. 3B), the distinction bit position takes place in that column as described above and the order between the two index keys are determined by the lexicographic order of the variable-size strings in that column.

To compare two index keys, a binary comparison (by word sizes) of the two keys is performed. If one index key is shorter, it is padded with O's in the binary comparison. Note, the padded value does not affect the order of the two keys. In this manner, distinction bits and distinction bit positions are defined on full index keys derived from multiple columns.

In some embodiments, the sort key compression scheme disclosed herein might be applied to an index tree in a commercial in-memory DBMS, though it can work with any variant of the B+ tree index structure. FIG. 4A depicts the structure of an example index tree 400 compatible with some embodiments herein. A leaf node (e.g., FIG. D) of the index tree contains a list of entries, one for each index key, plus a pointer to the next node. A leaf node entry (FIG. 4E) consists of a partial key value, a distinction bit position, an index key length, and a record ID. There is a record reader that gets a record ID as input and returns the full index key corresponding to the record ID. The header 405 of a leaf node contains a pointer to the last index key of the entries in that leaf node. A non-leaf node (FIG. 4B) contains a list of entries plus a pointer to the next node. A non-leaf node entry (4C) includes of a partial key, a distinction bit position, an index key length, a pointer to the child node corresponding to the entry, and a pointer to the last index key in the descendant leaves of the child, where the partial key and the index key length are those of the last full index key and the distinction bit position is that of the last full index key against the last full index key of the previous entry.

In addition, the following information for each index tree is maintained (i.e., kept), which is referred to herein as the DS-Info, where DS stands for D-bit Slice.

D' bitmap: The compression scheme herein requires distinction bit positions, which can be represented by a bitmap. The position of each bit in the bitmap represents the position in the full index key, where the value 0 means that the bit position is not a distinction bit position and the value 1 means that it is possibly a distinction bit position.

Variant bitmap: Variant bit positions are stored in a bitmap, where value 0 in a bit position means that the bit position is not a variant bit position and value 1 means that it is possibly a variant bit position.

Reference key value: A reference key value is maintained for invariant bits, which can be an arbitrary index key value because the invariant bits are the same for all index keys.

The variant bitmap and a reference key value can be maintained in order to obtain partial keys when rebuilding an index tree. If partial keys are not needed in an index, the variant bitmap and a reference key value are not necessary and the D' bitmap need only be maintained, which is the main information to keep for efficient index rebuilding.

Search, insert, and delete operations can be performed with the index tree and DS-Info as described below.

For a search operation and a given search key value K, the index tree is searched for K as follows.

In a non-leaf node, compare K with an index key in a non-leaf node entry. Since the entry has a pointer to the last full index key value (e.g., A) in the descendant leaves, a binary comparison is made of two full key values K and A.

A leaf node contains a list of partial keys except the last which is a full key. Therefore, compare search key K with a list of partial keys.

For an insert operation and a given an insert key value K, insert K into the index tree as follows.

1. Search down the index tree with K and find the right place for insertion (say, between two keys A and B).

2. Compute the distinction bit positions D-bit(A, K) and D-bit(K, B).
3. Make changes in the index tree corresponding to the insertion and update the D' bitmap and the variant bitmap as follows. For the D' bitmap, remove the bit position D-bit(A, B) and add new distinction bit positions D-bit(A, K) and D-bit(K, B). By Lemma 1, however, D-bit(A, B)=min(D-bit(A, K), D-bit(K, B)). Since the minimum position is already set in D' bitmap, we need only set max(D-bit(A, K), D-bit(K, B)) in the D' bitmap if it is not already set. For the variant bitmap, we perform a bitwise exclusive OR on K and the reference key value and perform a bitwise OR on the variant bitmap and the result of the above bitwise exclusive OR. The result will be the new variant bitmap. Note, the number of actual write operations on the D' bitmap is bounded by the number of 1's in the D' bitmap. Thus, the chances that an actual write operation on the D' bitmap occurs during an insert are very low. This is the same for the variant bitmap.

For delete operations and given a delete key value K, delete K from the index tree as follows.

Delete K as a usual deletion is done in the index tree and leave the D' bitmap and the variant bitmap without changes. We need to show that the D' bitmap is valid after deleting K. Let A and B be the previous key value and the next key value of K, respectively. After deleting K, D-bit(A, B) should be set in the D' bitmap. Again by Lemma 1, D-bit(A, B)=min (D-bit(A, K), D-bit(K, B)). Since D-bit(A, K) and D-bit(K, B) are set in the D' bitmap, D-bit(A, B) is already set, whether it is D-bit(A, K) or D-bit(K, B).

An update operation is accomplished by a delete operation followed by an insert operation.

As the data in a DB table changes, the DS-Info is up dated incrementally as disclosed above. For example, when an insert occurs, at most one distinction bit position is added to the D' bitmap and some variant bit positions may be added to the variant bitmap. This operation does not revert, even if there is a delete or rollback, because implementing the revert is quite expensive. Therefore, there may be positions in the D' bitmap whose values are 1 but which are not distinction bit positions. Also, the variant bitmap may have positions whose values are 1 but which are not variant bit positions. However, they do not affect the correctness as shown in Theorem 2. These bit positions can be removed by scanning the index and computing the DS-Info occasionally. If the index is rebuilt anew, then there will be no such bit positions.

With the current DS-Info, we can rebuild the index tree (as will be described in greater detail below) and a new DS-Info when it is lost or unavailable. To distinguish the current DS-Info from the new DS-Info being computed, the current DS-Info will be called the given DS-Info. Even after the index tree is rebuilt, we may use the given DS-Info as the DS-Info. However, index rebuilding is a good time to compute the DS-Info anew. To make a new D' bitmap, compressed keys are extracted from index keys by the given D' bitmap, the compressed keys are sorted, and the distinction bits between adjacent compressed keys are computed (where all three steps are part of index rebuilding). In some embodiments, an arbitrary one from the compressed keys is taken as the reference key value. To make a new variant bitmap, the variant bitmap is all 0 initially and the following is done: take compressed keys one by one (say, K) and perform a bitwise exclusive OR on K and the reference key value, followed by a bitwise OR with the variant bitmap as in the insert operation above. (Note, the bit positions where the given variant bitmap was 0 remain as invariant bit positions in the new variant bitmap.) If we build an index tree for the first time (i.e., there is no DS-Info at all), then we compute the D' bitmap and the variant bitmap as above, but with full index keys rather than compressed keys.

Now described below is an example of how to build an index tree on-the-fly from a DB table by using the DS-Info. In some embodiments, we extract only the bits in the positions that are set in the D' bitmap from the index key values, which is referred to herein as sort key compression. Sort key compression is the main reason for smaller space usage and speedup of index building herein.

Figure 5:
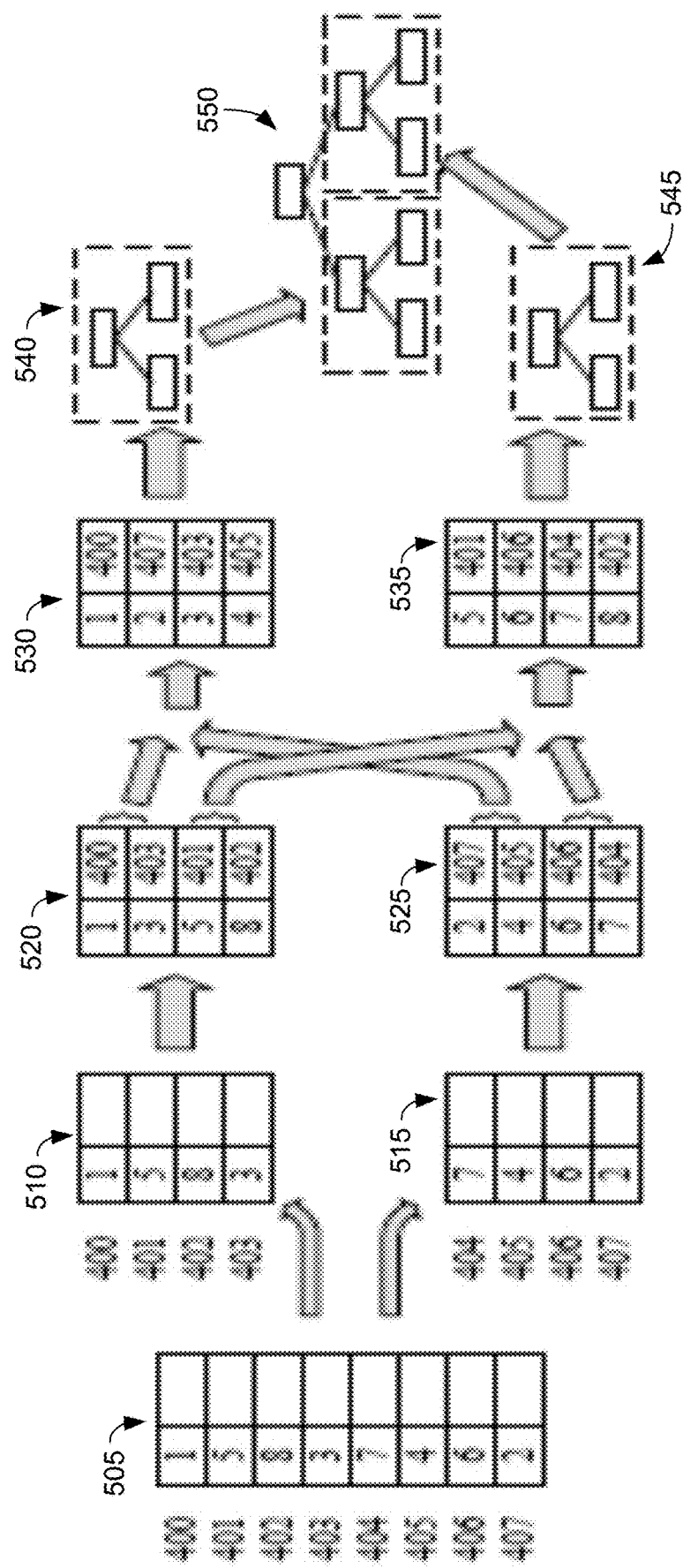
FIG. 5 is an illustrative depiction of an index rebuilding procedure.

FIG. 5 is an illustrative depiction of an overall procedure of parallel index building, in accordance with some example embodiments herein. In particular, to collect index keys in parallel, data pages of a target table 505 are evenly distributed to the cores (not shown in FIG. 5), as illustrated by the groupings of pages 510 and 515 distributed to different cores. Each core scans the assigned data pages and extracts compressed keys and corresponding record IDs (RIDs). A pair including a compressed key and the corresponding record ID makes a sort key. The key-RID pairs of the present example are shown in FIG. 5 at 520 and 525. The compressed key-RID pairs are sorted at 530 and 535 of FIG. 5 by a parallel sorting algorithm. Based on the sorted compressed key-RID pairs, an index tree 550 is built in a bottom-up fashion by merging the trees 540 and 545 from the multiple cores.

Figure 6:
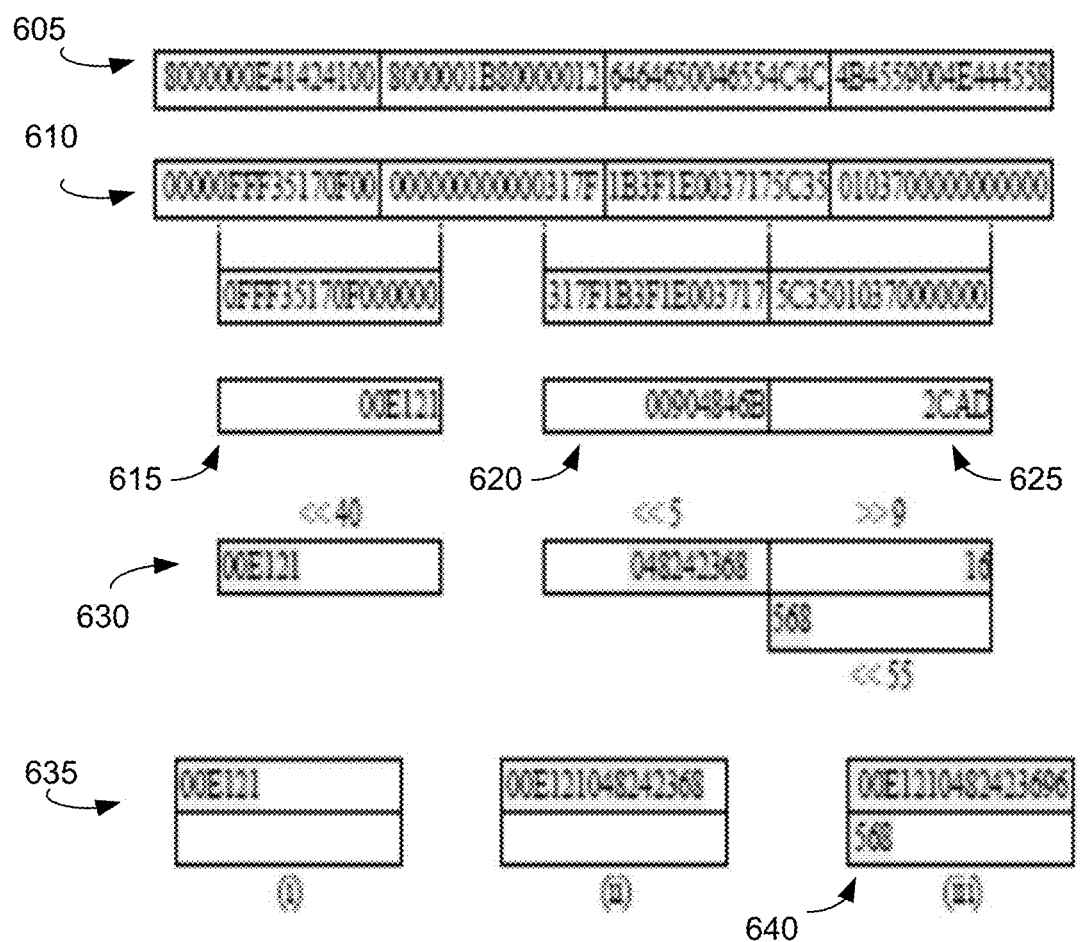
FIG. 6 is an illustrative depiction of example data formatting and processing, in accordance with some embodiments.

In some aspects, sort key compression can be done by extracting the bits in the positions which have value 1 in the D' bitmap. Now described is how to get compressed keys from index keys. FIG. 6 illustrates examples in the big endian format, although an actual implementation may use the little endian format of particular processors.

For a full key 605, masks 615, 620, and 625 of 8 bytes long are computed from D' bitmap 610. The first mask starts from the byte which contains the first 1 in the bitmap and it is 8 bytes long. The second mask starts from the byte which contains the first 1 after the first mask, and it is 8 bytes long, etc. In the example of FIG. 6, three masks are obtained from D' bitmap 610.

By, for example BMI instruction PEXT (which copies selected bits from the source to contiguous low-order bits of the destination), bits located in the positions where the masks have value 1 are extracted from an index key, as illustrated in FIG. 6 at 630. The process of FIG. 6 continues by concatenating the extracted bits with shift and bitwise OR operations. Since there are three masks in FIG. 6 (e.g., masks 615, 620, and 625), the extracted bits are concatenated in three steps (i), (ii), and (iii) by a shift (635) and a bitwise OR (640) in each step, as illustrated in FIG. 6. In FIG. 6, the bit string in 645 is the compressed key extracted from the full key 605.

Once the pairs of compressed index key and record ID are sorted in key order, the index tree can be built in a bottom-up fashion. First, leaf nodes can be built from the sorted compressed keys and record IDs. To compute distinction bit positions, we make an array D'-offset[i] from the D' bitmap, which stores the position of the i-th 1 in the D' bitmap. Then, the distinction bit position of key and $key_{i+1}$ is D'-offset[D-bit(Compress(key), Compress($key_{i+1}$))]. Next, we build non-leaf nodes in a bottom-up fashion. For two adjacent entries in a non-leaf node that correspond to $key_i$ and $key_j$ the distinction bit position is D'-offset[D-bit(Compress ($key_i$), Compress($key_j$))].

In the case of the index tree of the present example, the leaf nodes and non-leaf nodes contain partial keys of a predefined length p. The off-set of a partial key is the same as the distinction bit position of the key value. Given the offset of a partial key and the predefined partial key length p, the bits of the partial key are determined as follows.
1. If a bit position of the partial key is included in the compressed key, the bit value can be directly copied from the compressed key.
2. If a bit position is a position that has value 0 in the variant bitmap (i.e., an invariant bit position), the bit value can be copied from the reference key value.
3. Otherwise (i.e., a bit position which has value 0 in the D' bitmap and value 1 in the variant bitmap), we have two options.
   a. Add the bits required for partial key construction (p bits following the distinction bit position) to the compressed key and use them here for index construction.
   a. Since the record ID is also contained in the sort key, necessary bits can be copied from the record, for which a dereferencing is required.

To build an index, two parameters are maintained: max fanout and a fill factor. Each (leaf or non-leaf) node is of size 256B and it has a header (24B) and a pointer to the next node (8B). Since each entry in a leaf node takes 16B, the max fanout (i.e., maximum number of entries) in a leaf node is 14. Since each entry in a non-leaf node takes 24B, the max fanout in a non-leaf node is 9. The fill factor is defined for each index during index building and leaf and non-leaf nodes are filled up to max fanout×fill factor. The default value of the fill factor in this example is 0.9. For a given number of records, the fill factor, and the max fanouts, the height of the index tree can be determined.

Index construction can be parallelized by partitioning the sorted pairs of index key and record ID and constructing subtrees in parallel. That is, n sort keys are divided into p blocks and $$\frac{n}{p}$$

sort keys each, and one block is assigned to a thread (which is the situation at the end of the row-column sort). Thread i ($1 \leq i \leq p$) constructs a subtree consisting of all sort keys in the i-th block. When all of the subtrees are constructed, they are merged into one tree as follows. Since the fanouts of the root nodes of the subtrees can be much less than max fanout×fill factor, just linking the root nodes of the subtrees may increase the height of the whole tree unnecessarily. Hence, we remove the root nodes of the subtrees and build the top layers of the whole tree by linking the children of the root nodes of the subtrees. In this manner, the height of the whole tree can be minimized.

Various aspects of the present disclosure have been illustrated through several example embodiments and applications, including the corresponding drawings herewith. The present disclosure is not limited to the specific example embodiments however. The technical and useful sort key compression features disclosed herein (e.g., lightweight in the sense that the amount of information maintained is relatively small (i.e., a minimum number of bits from sort keys) coupled with performance and memory improvements) may be applied to any application that might resort data after an initial or first sorting operation without a transient data set.

Figure 7:
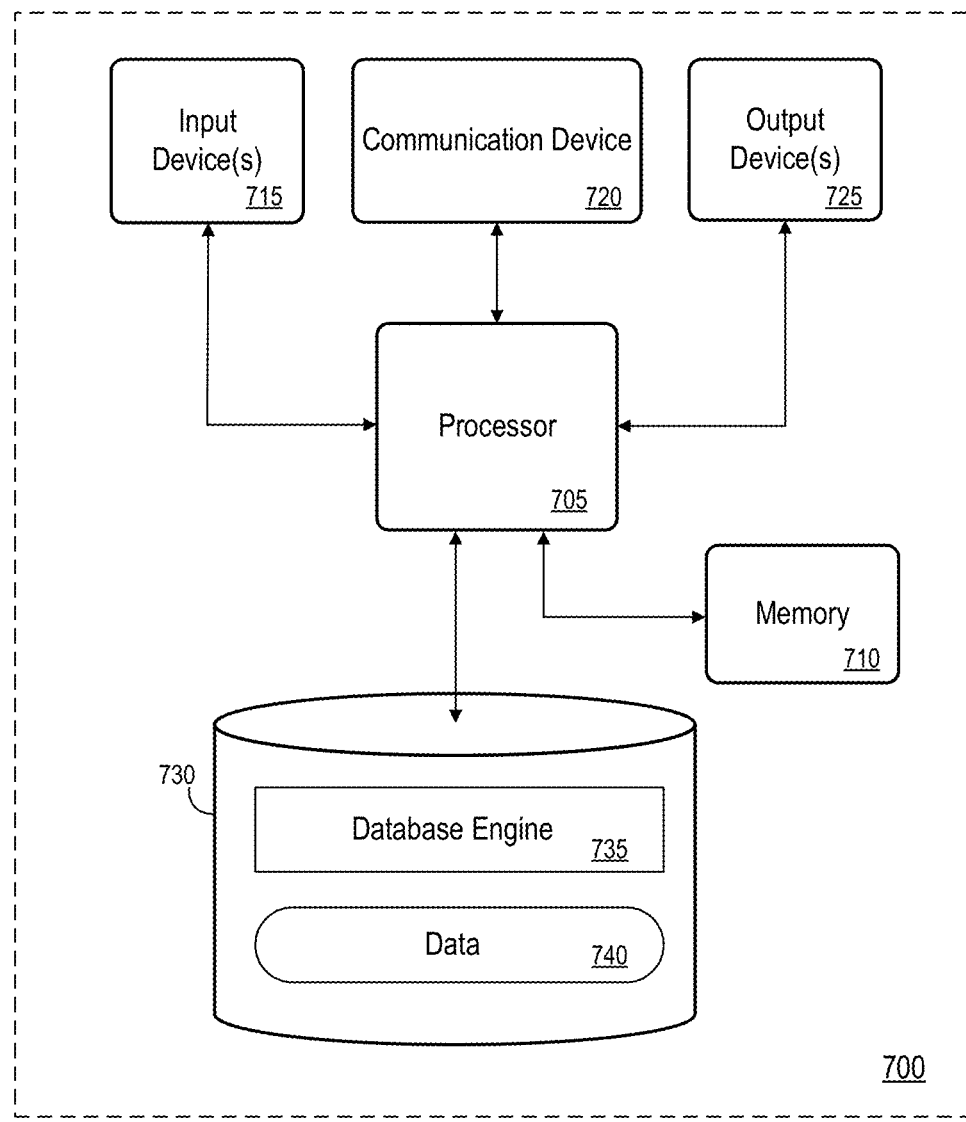
FIG. 7 is a block diagram of an example system, according to some embodiments.

FIG. 7 illustrates an exemplary system diagram for performing the processes described herein. Apparatus 700 includes processor 705 operatively coupled to communication device 720, data storage device 730, one or more input devices 715, one or more output devices 725 and memory 710. Processor 705 may include a multi-core processor capable of executing multiple threads simultaneously by the multiple cores therein. Communication device 720 may facilitate communication with external devices, such as a reporting client, or a data storage device. Input device(s) 715 may comprise, for example, a keyboard, a keypad, a mouse or other pointing device, a microphone, knob or a switch, an infra-red (IR) port, a docking station, and/or a touch screen. Input device(s) 715 may be used, for example, to enter information into apparatus 700. Output device(s) 725 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 710 may comprise Random Access Memory (RAM), Storage Class Memory (SCM) or any other fast-access memory.

Database engine 735 may comprise logic executed by processor 705 to cause apparatus 700 to perform any one or more of the processes described herein (e.g., the index rebuilding and sort key compression processes). Embodiments are not limited to execution of these processes by a single apparatus.

Data 740 (either cached or a full database) may be stored in volatile memory such as memory 725. Data storage device 730 may also store data and other program code and instructions for providing additional functionality and/or which are necessary for operation of apparatus 700, such as device drivers, operating system files, etc.

The foregoing diagrams represent logical architectures for describing processes according to some embodiments, and actual implementations may include more or different components arranged in other manners. Other platforms, frameworks, and architectures may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computer-implemented method comprising:
   determining, by a processor, distinction bit positions for index keys of a database index, the distinction bit positions including distinction bits for the index keys, the distinction bits being the minimum information necessary and sufficient to determine a correct lexicographic single order of all of the index keys, wherein the lexicographic order of the index keys cannot be properly determined if any distinction bit position is missing;
   determining, by the processor, a concatenation of the bits of the index keys in the determined distinction bit positions; and
   generating a record of the concatenation, the record of the concatenation including the minimum information necessary and sufficient to determine a correct lexicographic order for all of the index keys of the database.

2. The method of claim 1, wherein the concatenation is determined for all of the index keys over the database.

3. The method of claim 1, further comprising determining a lexicographic order of the index keys based on the concatenation.

4. A computer-implemented method comprising:
   determining, by a processor, distinction bit positions for index keys of a database index, the distinction bit positions including distinction bits for the index keys, the distinction bits being the minimum information required to determine a correct lexicographic single order of all of the index keys, wherein the lexicographic order of the index keys cannot be properly determined if any distinction bit position is missing;
   representing the determined distinction bit positions as a first bitmap, the position of each distinction bit in the first bitmap corresponding to the distinction bit's position in the index keys;
   representing variant bit positions of the index keys as a second bitmap, the variant bit positions being bit positions where all key values for a bit position are not identical;
   assigning a reference key value for invariant bit positions of the index keys, the invariant bit positions being bit positions where all key values for a bit position are identical; and
   maintaining a record of the first bitmap, the second bitmap, and the reference key values during a database operation for the database index.

5. The method of claim 4, wherein the database operation is at least one of an insert operation, a delete operation, and an update operation.

6. The method of claim 4, wherein for the first bitmap a value equal to zero for a bit in the first bitmap indicates the bit position is not a distinction bit position and a value of one for a bit in the first bitmap indicates the bit position is possibly a distinction bit position.

7. The method of claim 4, wherein for the second bitmap a value equal to zero for a bit in the second bitmap indicates the bit position is not a variant bit position and a value of one for a bit in the second bitmap indicates the bit position is possibly a variant bit position.

8. The method of claim 4, wherein the reference key value assigned to the invariant bit positions is an arbitrary index key value since the key values for the invariant bit positions are identical.

9. A computer-implemented method for parallel index rebuilding, the method comprising:
   collecting, by a processor, index keys of a database index in parallel, wherein data pages of a target table are grouped and evenly distributed to a plurality of processor cores;
   scanning, by each of the plurality of processor cores having the data pages distributed thereto, the data pages to extract compressed keys and corresponding record identifiers from the data pages;
   sorting, by the plurality of the processor cores having the data pages distributed thereto, pairs of the compressed keys and corresponding record identifiers in accordance with a parallel sorting algorithm;
   generating an index tree in a bottom-up fashion by merging index subtrees constructed from the sorted compressed keys and corresponding record identifiers; and
   storing a record of the generated index tree.

10. The method of claim 9, wherein a compressed key and a corresponding record identifier comprises a sort key.

11. A system comprising:
    a memory storing processor-executable instructions; and
    a processor to execute the processor-executable instructions to cause the system to:
       determine distinction bit positions for index keys of a database index, the distinction bit positions including distinction bits for the index keys, the distinction bits being the minimum information necessary and sufficient to determine a correct lexicographic single order of all of the index keys, wherein the lexicographic order of the index keys cannot be properly determined if any distinction bit position is missing;
       determine a concatenation of the bits of the index keys in the determined distinction bit positions; and
       generate a record of the concatenation, the record of the concatenation including the minimum information necessary and sufficient to determine a correct lexicographic order for all of the index keys of the database.

12. The system of claim 11, wherein the concatenation is determined for all of the index keys over the database.

13. The system of claim 11, further comprising the processor executing the processor-executable instructions to cause the system to determine a lexicographic order of the index keys based on the concatenation.

14. A system comprising:
    a memory storing processor-executable instructions; and
    a processor to execute the processor-executable instructions to cause the system to:
       determine distinction bit positions for index keys of a database index, the distinction bit positions including distinction bits for the index keys, the distinction bits being the minimum information necessary and sufficient to determine a correct lexicographic single order of all of the index keys, wherein the lexicographic order of the index keys cannot be properly determined if any distinction bit position is missing;
       represent the determined distinction bit positions as a first bitmap, the position of each distinction bit in the first bitmap corresponding to the distinction bit's position in the index keys;
       represent variant bit positions of the index keys as a second bitmap, the variant bit positions being bit positions where all key values for a bit position are not identical;

assign a reference key value for invariant bit positions of the index keys, the invariant bit positions being bit positions where all key values for a bit position are identical; and maintain a record of the first bitmap, the second bitmap, and the reference key values during a database operation for the database index.

15. The system of claim 14, wherein the database operation is at least one of an insert operation, a delete operation, and an update operation.

16. The system of claim 14, wherein for the first bitmap a value equal to zero for a bit in the first bitmap indicates the bit position is not a distinction bit position and a value of one for a bit in the first bitmap indicates the bit position is possibly a distinction bit position.

17. The system of claim 14, wherein for the second bitmap a value equal to zero for a bit in the second bitmap indicates the bit position is not a variant bit position and a value of one for a bit in the second bitmap indicates the bit position is possibly a variant bit position.

18. The system of claim 14, wherein the reference key value assigned to the invariant bit positions is an arbitrary index key value since the key values for the invariant bit positions are identical.

19. A system comprising:

a memory storing processor-executable instructions; and a plurality of processor cores to execute the processor-executable instructions to cause the system to:

collect index keys of a database index in parallel, wherein data pages of a target table are grouped and evenly distributed to the plurality of processor cores;

scan, by each of the plurality of processor cores having the data pages distributed thereto, the data pages to extract compressed keys and corresponding record identifiers from the data pages;

sort, by a plurality of the processor cores having the data pages distributed thereto, pairs of the compressed key and corresponding record identifiers in accordance with a parallel sorting algorithm;

generate an index tree in a bottom-up fashion by merging index subtrees constructed from the sorted compressed keys and corresponding record identifiers; and store a record of the generated index tree.

20. The system of claim 19, wherein a compressed key and a corresponding record identifier comprises a sort key.

* * * * *